United States Patent [19]

Taylor

[11] Patent Number: 5,195,730
[45] Date of Patent: Mar. 23, 1993

[54] UNIVERSAL PRECISION POSITIONING JIG

[76] Inventor: Christopher L. Taylor, 13229 Cedar La., Dallas, Tex. 75234

[21] Appl. No.: 893,492

[22] Filed: Jun. 4, 1992

[51] Int. Cl.⁵ .......................... B23Q 3/00; G01B 5/14
[52] U.S. Cl. ...................................... 269/303; 33/811;
33/197; 144/253 R; 269/229; 269/236
[58] Field of Search .................... 33/197, 648, 811;
269/303, 37–45, 236, 229; 144/253 R

[56] References Cited

U.S. PATENT DOCUMENTS 4,793,604  12/1988  Taylor ................................ 269/303
4,930,221   6/1990  Taylor ................................  33/197

Primary Examiner—W. Donald Bray

[57] ABSTRACT

An improved positioning jig which includes two principal relatively flat members adapted for locking and unlocking engagement/disengagement with each other and which are normally urged apart in the unlocked condition by a pair of elongated spring-like members which separate the two principal relatively flat members. Each of the two members includes a mating set of teeth which are adapted for engagement with corresponding teeth on the other member and which permit adjustments in small discrete steps over an extended range. When it is desired to lock the two members together, a bi-directional cam clamp is rotated through about 90 degrees so as to impart a vertical camming force to the upper relatively flat member thereby forcing it downwardly in opposition to the spring bias until teeth of the upper member and those of the lower member are engaged thereby locking the members together in the desired relationship. Also included are improved scalar measuring devices which are adapted for coordination with the aforementioned principal flat members so that in combination they together provide enhanced operational characteristics.

20 Claims, 6 Drawing Sheets

UNIVERSAL PRECISION POSITIONING JIG

FIELD OF THE INVENTION

This invention relates to woodworking equipment and more particularly to improved apparatus for precisely orienting and maintaining a work-piece in predetermined position relative to a cutting tool.

BACKGROUND OF THE INVENTION

In the practice of modern woodworking techniques, there has been a trend toward improving efficiency and rapidity of operation while retaining accuracy and repeatability with which various procedures can be employed. This has included a need for the ability to make rapid changes in equipment so as to facilitate such procedures and to reduce the amount of time required for adjustments. Thus, there has continued to be an emphasis on improving existing equipment and procedures so as to facilitate accuracy, repeatability and efficiency.

DESCRIPTION OF THE PRIOR ART

A variety of positioning jigs have heretofore been proposed, illustrative of which are those described in U.S. Pat. No. 4,793,604 granted of Christopher L. Taylor on Dec. 27, 1988. As set forth in that patent, there is disclosed a universal precision positioning jig that is especially adaptable for utilization with powered woodworking tools such as table saws, routers, and the like. According to these proposals, there have been disclosed multi-element jigs which include on both of a pair of positioning elements, a series of tooth-like projections each set of which is adapted for cooperative engagement/disengagement with corresponding tooth-like projections on the remaining positioning element, thereby providing for rapid and accurate repositioning in predetermined increments. Temporarily affixing such positioning elements has involved the utilization of a threaded handle in engagement with engaging mating bolt threads for tightening the bolt thereby to secure the pair of toothed body members and associated positioning elements in the desired relation. However, although the Taylor proposals reflect a substantial progress in the art, they nevertheless required the hand torquing of the threaded handle with the utilization of a significant amount of time in turning the handle sufficiently so as to release the two adjacent members, move them through a required distance with respect to one another, and then securely re-engage them. Moreover, certain measurements were not always easily visually observable by the operator, and entailed some degree of uncertainty as to the exact placement of one positioning element relative to the other. Accordingly, there has been a need for an improved mechanism for achieving the desired positioning, engagement and fastening of the two movable tooth elements both quickly and easily, while concurrently providing a readily settable, observable, and unambiguous visual indication of their position.

OBJECTS AND FEATURES OF THE INVENTION

It is one general object of the invention to improve precision positioning jigs.

It is another object of the invention to simplify such jigs.

It is still another object of the invention to increase the rapidity with which such jigs can be adjusted.

It is yet an additional object of the invention to facilitate measurements when adjusting the jig.

It is still another object of the invention to facilitate increasing the range of adjustment in adjustable jigs.

Accordingly, in accordance with one feature of the invention, an improved locking element is provided in the form of a multi-position cam clamp which can readily lock the two aforementioned positioning elements into the desired relative position merely by movement of a handle through an arc of 90 degrees.

It is another feature of the invention to provide a resilient member in a spring-like relationship between the two aforementioned relatively movable positioning elements thereby normally to urge such elements sufficiently apart so as to disengage the aforementioned teeth and render such elements movable with respect to each other.

It is another feature of the invention to elongate the resilient member and provide thereon a low friction bearing surface to facilitate relative movement between the two relatively movable positioning elements.

It is still one additional feature of the invention to include a channel-like longitudinal recess and an associated measuring element in cooperative relationship with the aforementioned two movable positioning elements and the cam clamp so as to facilitate observing the relative positions of the two aforementioned movable positioning elements thereby enhancing efficiency of use.

It is still one further feature of the invention to provide for addition of serially disposed rack positioning members thereby facilitating the extension of range of operation of the equipment.

It is yet one additional feature of the invention to include in associated combination with the aforementioned measuring element an improved movable hairline cursor, thereby providing for a high level of accuracy in calibrating and using the equipment.

These and other objects and features of the invention will be apparent from the following detailed description, by way of example, with reference to the drawing.

DETAILED DESCRIPTION OF A PREFERRED EMBODIMENT

The detailed disclosure of the above-referenced U.S. Pat. No. 4,793,604 which was granted Dec. 27, 1988 provides general background and is herein incorporated by reference.

Figure 1:
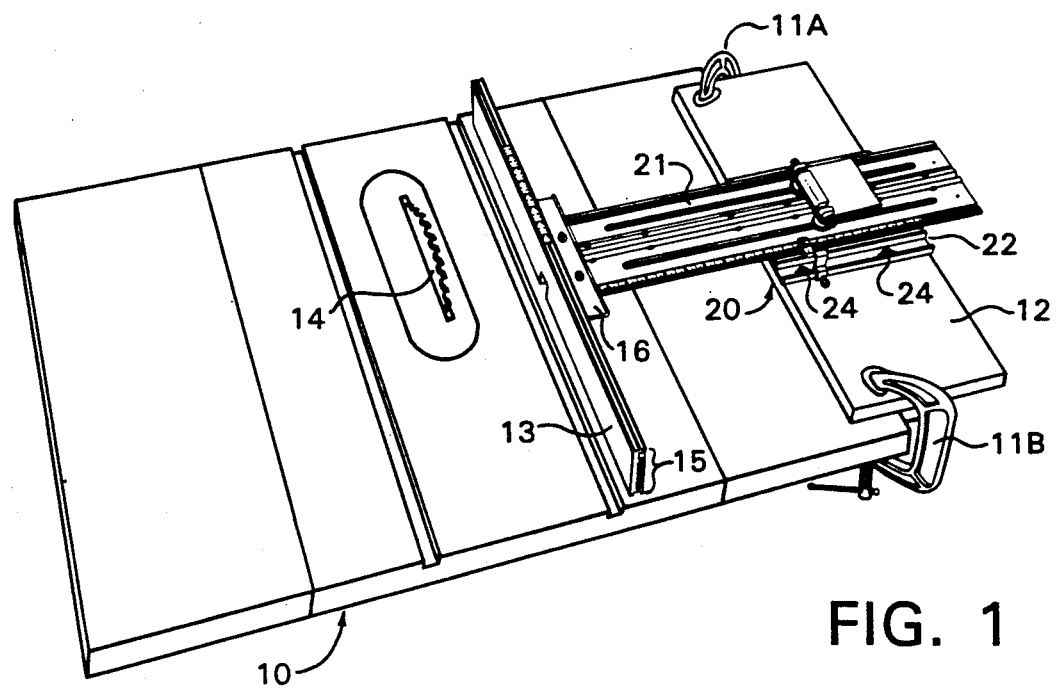
FIG. 1 is a perspective view showing a conventional table saw fitted with the improved jig assembly in accordance with the invention.

Now turning to FIG. 1 of the drawing, it will be observed that it depicts a conventional table saw generally shown at 10. Mounted thereon with the use of conventional "C" clamps 11a and 11b is an intermediate mounting board 12 which may be any of a variety of suitable well known boards such as a section of plywood, masonite or similar materials to which the jig assembly is fastened as will be described below.

A guiding fence 13 is shown in place for acting as a guide for work pieces which may be passed through the saw blade 14. Fence 13 may either be an ordinary piece of wood such as plywood of may be a specially constructed member having channels such as those designated by symbols 15 running longitudinally and which are adapted for the connection of quick release members which may optionally be attached to fence mounting bracket 16. An example of such specially constructed member is the INCRA* fence system manufactured and sold by the Taylor Design Group, Inc. of Dallas, Texas.

*Trademark

As will be observed from further reference to FIGS. 1 and 2, the jig assembly thereof (generally shown as 20) includes, in addition to fence mounting bracket 16, jig principal top portion 21 and jig base portion 22 which are adapted for relative movement therebetween as will hereinafter be described.

Figure 2:
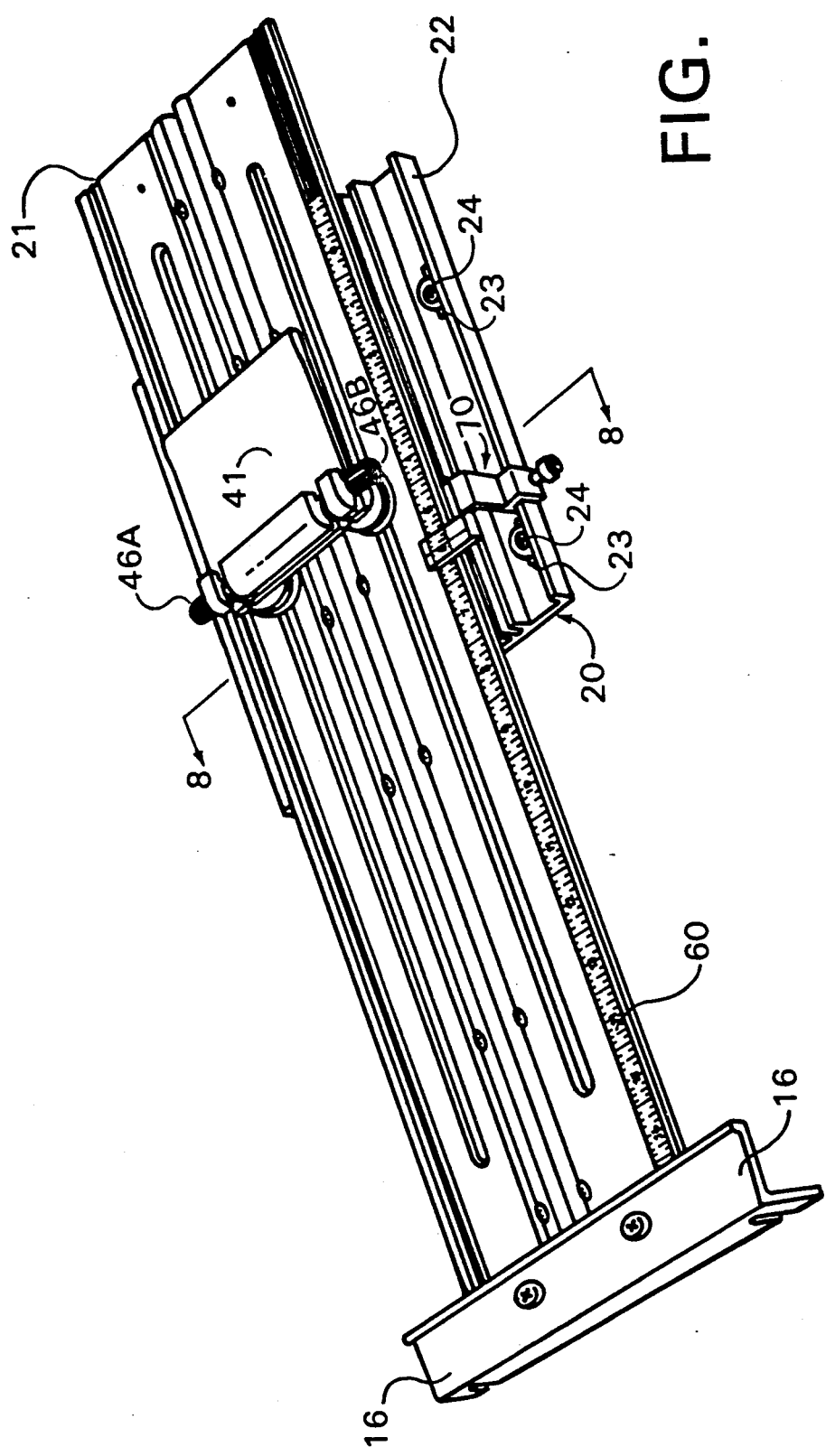
FIG. 2 is an enlarged perspective view of the jig assembly portion of FIG. 1.
Figure 3:
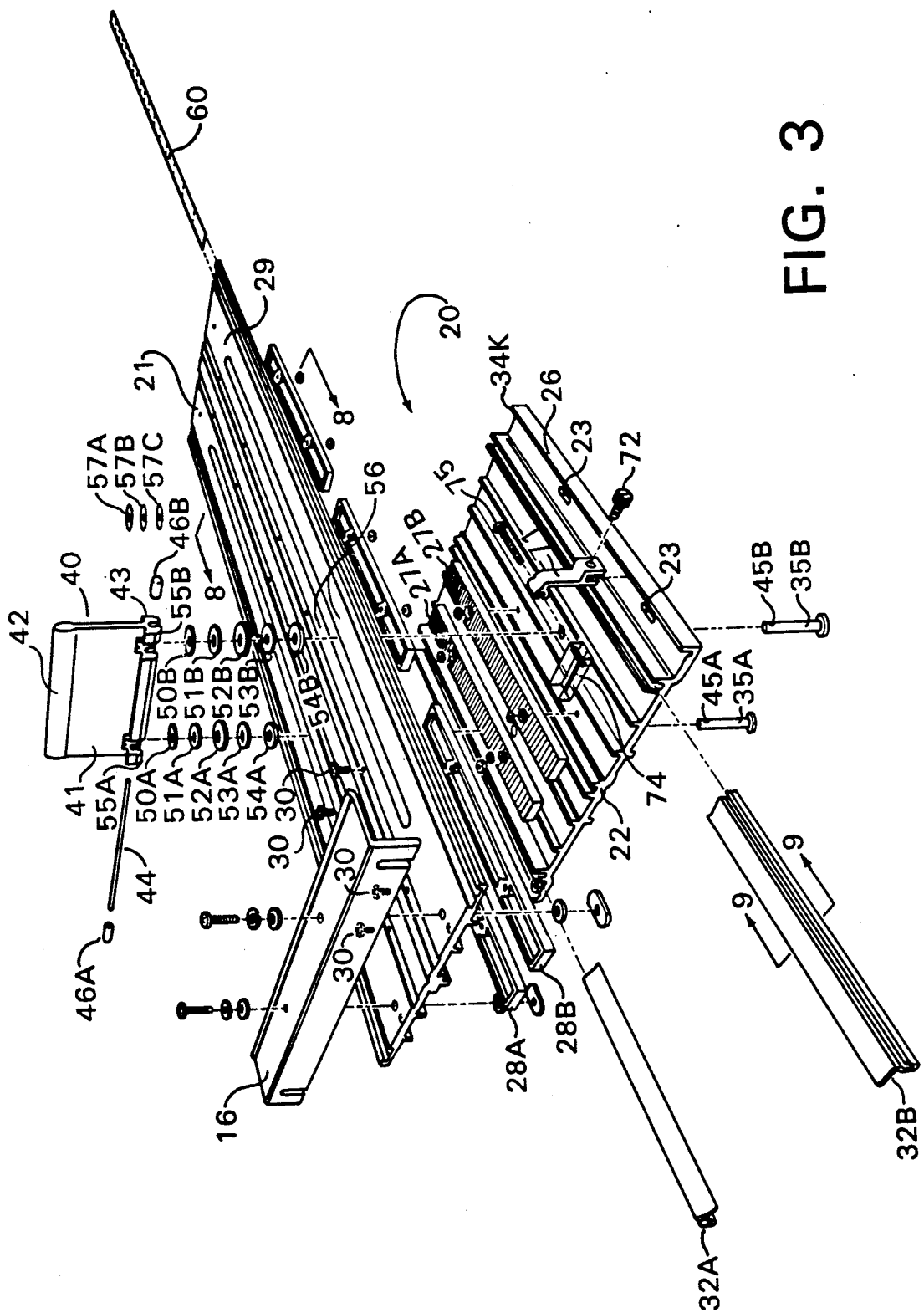
FIG. 3 is an exploded perspective view of the jig assembly of FIG. 2.

As will be evident from an inspection of FIGS. 2 and 3, mounting slots 23 are provided in jig base portion 22 for receiving conventional fastening bolts or screws 24 which may be employed to fasten jig base portion 22 to intermediate mounting board 12 (FIG 1). As will be observed form FIGS. 2 and 3, mounting slots 23 are elongated in a direction parallel to the principal longitudinal axis of both the jig top portion 21 and jig base portion 22 so as to provide for longitudinal adjustment of the position of jig base portion 22 with respect to intermediate mounting board 12.

Figure 4:
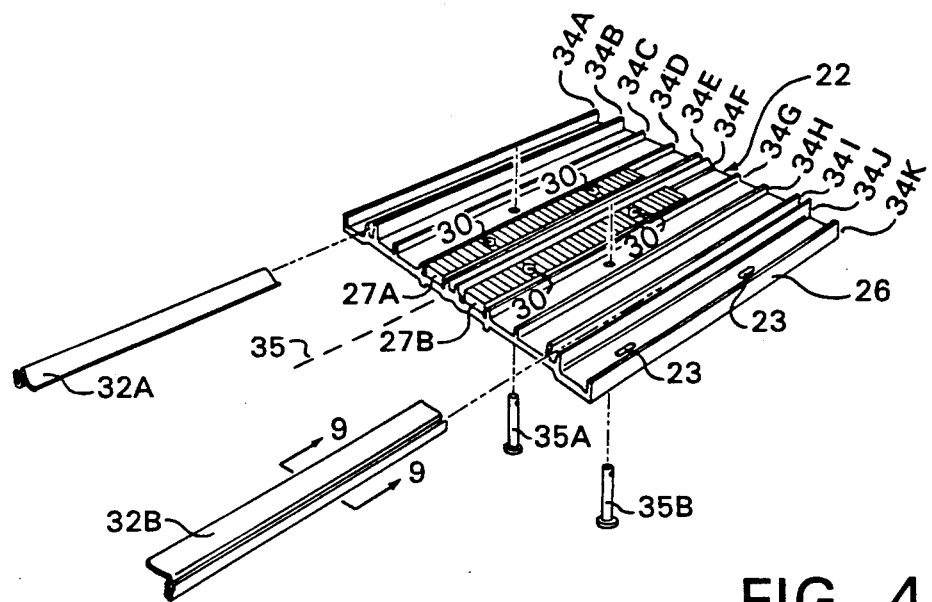
FIG. 4 is an exploded view of the lower portion of the jig assembly of FIG. 2.

FIG. 4 depicts jig base portion 22 in greater detail. There, it will be observed, is shown principal jig base portion block 26 to which there have been fastened a pair of toothed rack members 27a and 27b of the type shown in FIG. 4 of aforementioned U.S. Pat. No. 4,793,604. These toothed rack members 27a and 27b are adapted for discrete incrementally spaced engagement with mating teeth positioned on the lower surfaces of mating toothed rack members 28a and 28b the upper sides of which are shown in FIG. 3. The toothed rack members are preferably fastened to their supports (jig base portion block 26 (FIG. 4) and jig top portion block 29 (FIG. 3)) by conventional fastening members such as threaded bolts or screws 30 (FIG. 4).

Additional reference to FIG. 4 reveals a pair of elongated resilient spring members 32a and 32b. Members 32a and 32b are similar in length and cross-sectional configuration and are illustrated in greater detail in FIG. 9. As will be more particularly described in connection with FIG. 8, elongated resilient spring members 32a and 32b normally urge jig base block 26 and jig top block 29 apart so as to cause the aforementioned teeth of toothed rack members 27a/27b and 28a/28b apart thereby permitting relative longitudinal movement of jig top portion 21 with respect to jig base portion 22. Additionally, they provide a low friction bearing surface upon which jig top portion 21 can travel relative to jig base portion 22.

The material of which the two elongated spring members 32a and 32b are made is not critical so long as members 32a and 32b retain their spring-like characteristics, are suitably low in friction and high in abrasion resistance, and provide sufficient thrust to overcome the weight of the top portion 21 and retain it in its upward position disengaged from base portion 22 when not being overtly urged into engagement by multi position cam clamp assembly 40 (FIG. 3) as will be hereinafter more specifically described. However, in accordance with the preferred embodiment hereof, resilient spring members 32a and 32b are formed of extruded polycarbonate such as that sold under the trademark LEXAN. Such material has the advantageous characteristics of being readily extrudable, low in cost, relatively impervious to the contaminants most likely to be encountered in the practice of woodworking, maintenance of resiliency for long periods of time, relatively low in friction (e.g., dynamic coefficient of friction less than 0.2), and high in abrasion resistance. For the purposes of this description and claims, the term "low friction" means material having a dynamic coefficient of friction of 0.25 or less.

Additional reference to FIG. 4 reveals that jig base portion block 26 includes upwardly projecting ridges 34a-34k. These longitudinally extending ridges lie generally parallel to the principal longitudinal axis represented by a dashed line 35. Moreover, as will be observed from inspection of FIG. 8, selected ones of them are positioned so as to abut corresponding ridges positioned on the lower surface of top portion block 29.

In addition to the foregoing, there is depicted in FIG. 4 a pair of vertical clamping pins such as clevis pins 35a and 35b which will subsequently be seen to be a part of cam clamp assembly 40 (FIG. 3).

As will now be evident from the foregoing description, unless and until additional vertical thrust is imparted to jig top portion 21 (over and above the thrust represented by its weight), elongated spring members 32a and 32b will retain the teeth of the mating toothed rack members 27a/27b and 28a/28b apart (as shown in solid lines in FIG. 8) so as to permit lateral movement between such top portion 21 and the lower (or base) portion 22. However, when it is desired to lock top portion 21 in a predetermined position with respect to base portion 22, additional vertical thrust is imparted to top portion 21 by means of cam clamp assembly 40 (FIG. 3) thereby resulting in its downward movement to a point at which the teeth of toothed rack members 27a/27b and 28a/28b engage as shown in aforementioned FIG. 4 of U.S. Pat. No. 4,793,604 (and as represented by the dashed lines of FIG. 8), whereupon top portions 21 is affixed laterally with respect to base portion 22 thereby affixing its position with respect to work elements such as saw blade 14 or other powered woodworking devices such as conventional routers and the like.

As mentioned above, in accordance with the principles of the prior art, the aforementioned additional vertical thrust has previously been provided by a combination of a threaded bolt and a mating threaded handle which may be rotated to impart vertical thrust and consequently move an upper portion such as top portion 21 vertically with respect to another portion such as base portion 22. However, in accordance with the principles of this invention, there is advantageously provided in cooperative combination with the remaining structural elements that are associated therewith, bi-directional cam clamp assembly 40.

Cam clamp assembly 40 (FIG. 3) is seen to comprise bi-directional operating handle 41 which preferably includes at the upper extremity thereof an enlarged region 42 which is provided in order to facilitate gripping and manipulation. At the lower extremity of operating handle 41, there is a partially cylindrical slot 43 which extends transversely the entire width of handle 41 and which is adapted to receive therein cam clamp pivot pin 44.

Cam clamp pivot pin 44 acts as a support for bi-directional operating handle 41. Pivot pin 44 is supported by clevis pins 35a and 35b which include near their upper extremities apertures 45a and 45b which are adapted for receiving the respective ends of cam clamp pivot pin 44 when assembled. In order to retain pin 44 in position extending through apertures 45a and 45b, there are provided frictional end caps 46a and 46b which are pushed onto the corresponding ends of pivot pin 44 after pin has been extended through aperture 45a, partially cylindrical slot 43 and aperture 45b.

In order to facilitate smooth and effective operation of cam clamp assembly 40, there are provided two sets of washers 50a-54a and 50b-54b which are mounted respectively on clevis pins 35a and 35b. These sets of washers preferably include relatively thick nylon flat washers 50a/50b, relatively thick metal flat washers 51a/51b, relatively thick rubber flat washers 52a/52b, relatively thick metal flat washers 53a/53b and relatively thick nylon flat washers 54a/54b.

Although the compositions and thicknesses of the aforementioned washers is not critical, there are certain qualities and interrelationships that are important features of the invention. Thus, the relatively thick rubber washers impart an important quality of resiliency that not only acts as a shock absorber but more importantly as a tolerance absorber. Because of their compressibility, optimum clamping pressure can be assured over a much greater range of tolerance variations in other parts of the cam clamp assembly.

In accordance with the preferred embodiment, the relatively thick nylon flat washers 50a/50b and 54a/54b are about 1" in outside diameter and about 0.062" in thickness; the relatively thick metal flat washers 51a/51b and 53a/53b are about 1" in outside diameter and 0.055" in thickness; and the relatively thick rubber flat washers 52a/52b are approximately 1.125" in outside diameter and 0.187" in thickness.

As will be immediately evident to those skilled in the art, when bi-directional operating handle 41 of cam clamp assembly 40 is operated by swinging it through an arc of 90° degrees (FIG. 6), camming surfaces 55a and 55b move each of the aforementioned stacks of washers in a vertical direction so that they slide upward and downwardly on clevis pins 35a and 35b. Accordingly, vertical thrust is imparted through washer stacks 50a-54a and 50b-54b to the upper surfaces 56 of the jig top portion block 29 of jig top portion 21 thus resulting in a corresponding vertical movement of jig top portion 21, thus imparting sufficient movement to engage the teeth of toothed rack members 27a/27b and 28a/28b (as described above) so as to affix them securely in the selected lateral position. When the operating handle 41 is moved to the disengaging position (When it is vertical as shown in FIGS. 3 and 6), reverse movement takes place in response to the upward spring thrust imparted by elongated resilient spring members 32a and 32b.

Figure 5:
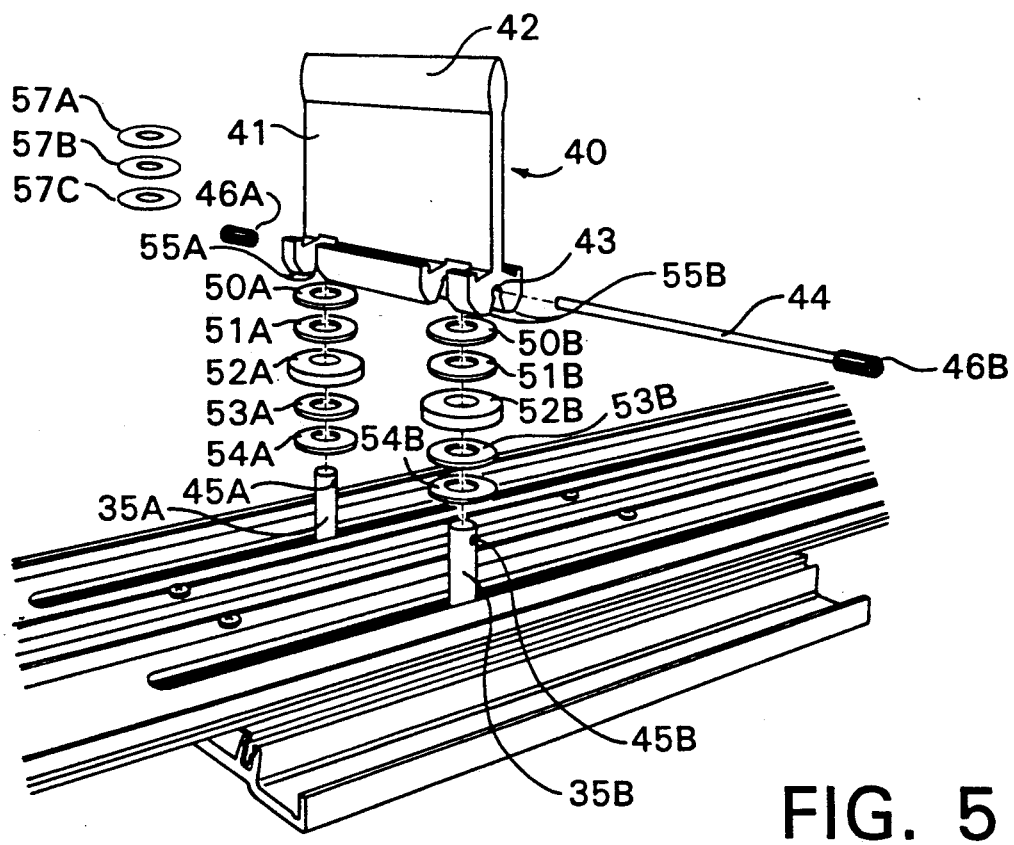
FIG. 5 is an exploded view showing the principal elements of the improved cam clamp assembly in accordance with the invention.

The above-described elements of the cam clamp assembly are shown in greater detail FIG. 5. However, in addition to the above-described components, there are shown three optional shim washers which preferably are included so as to permit optimal adjustment of the above-described clamping mechanism. Washers 57a14 57c thus will be seen to be relatively thin so as to provide adjustability in small increments. As will be evident to one skilled in the art, the precise thickness of the shim washers 57a/57c is a matter of choice and reflects tradeoffs between the desired increments of adjustability and mechanical strength.

Figure 6:
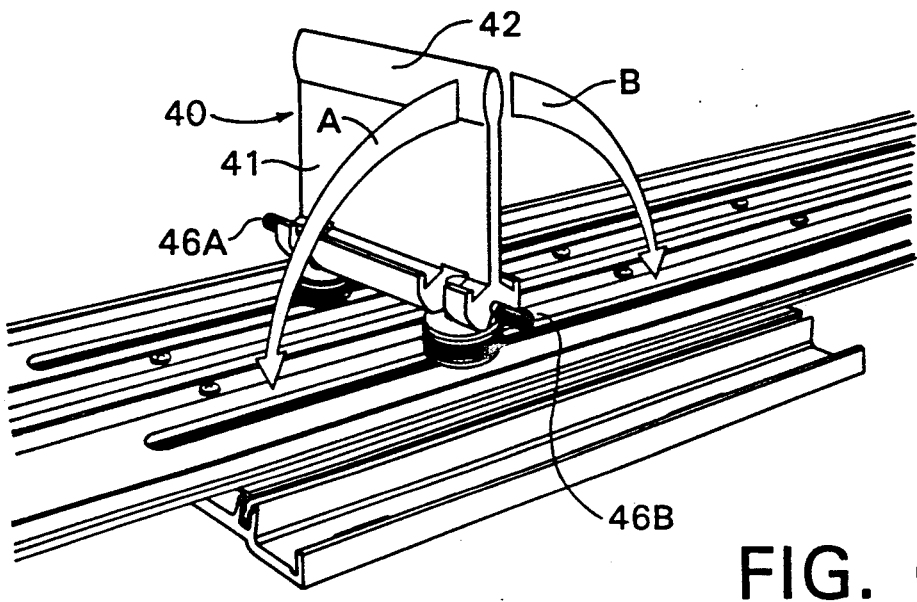
FIG. 6 is a perspective view illustrating the bi-directionality of the activating handle of the cam clamp assembly of FIG. 5.

FIG. 6 illustrates the bi-directionality of operation of cam clamp assembly 40. There, it will be observed, that because of the symmetry of the camming surfaces 55a and 55b shown in FIG. 5, (such symmetry being with respect to partially cylindrical slot 43 and cam clamp pivot pin 44), movement of operating handle 41 through the arc represented by either arrow A or arrow B will result in the above-described clamping action.

As mentioned above, one of the features hereof is that of the cooperative and efficacious combination of a readily movable and adjustable hairline cursor in combination with a longitudinally disposed measuring element as shown in FIGS. 1, 2, 3, 7 and 8. The measuring element, or scale or template, 60 (shown in FIGS. 2, 3 and 7) is slid into channel 61a (FIG. 8) and is retained in position by the bowing action of upwardly projecting ridge 62a. Further reference to FIG. 8 reveals that the width of channel 61a is greater than the upward opening thereto because of recesses of portions 63a and 64a. Therefore, when resilient scale 60 is slid into position within channel 61a, and held in place by the inwardly extending lips 65a and 66a, its center line region will be bowed upwardly because of upward pressure exerted by ridge 62a; and scale 60 therefore will be retained in position by friction which ordinarily maintains it in a fixed position but which permits manual longitudinal frictional movement or adjustment by an operator. Additionally, the width of scale 60 may be made slightly greater than the greatest distance between recesses of portions 63a and 64a thus contributing to the bowing occasioned by ridge 62a.

Figure 8:
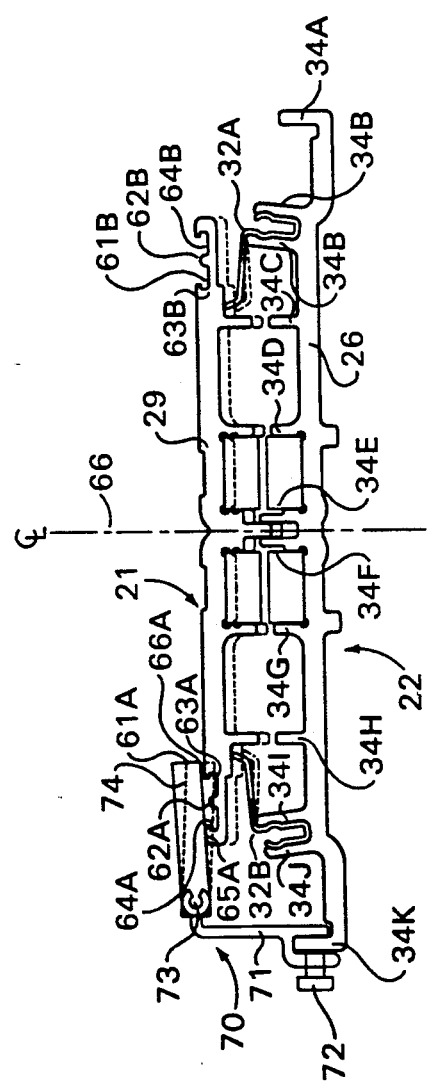
FIG. 8 is a section taken through the jig assembly of FIGS. 2 and 3 and illustrating the interrelationship between the upper and lower principal essentially flat members.

Further reference to FIG. 8 reveals that jig top portion block 29 is generally symmetrical about its center line 66 and thus it includes a corresponding channel 61b and associated parts at the opposite side. This, of course, permits the employment of an additional scale or template and cursor (if one should so desire) and permits the utilization of a scale in one location and a template or other type scale in the remaining location.

Figure 7:
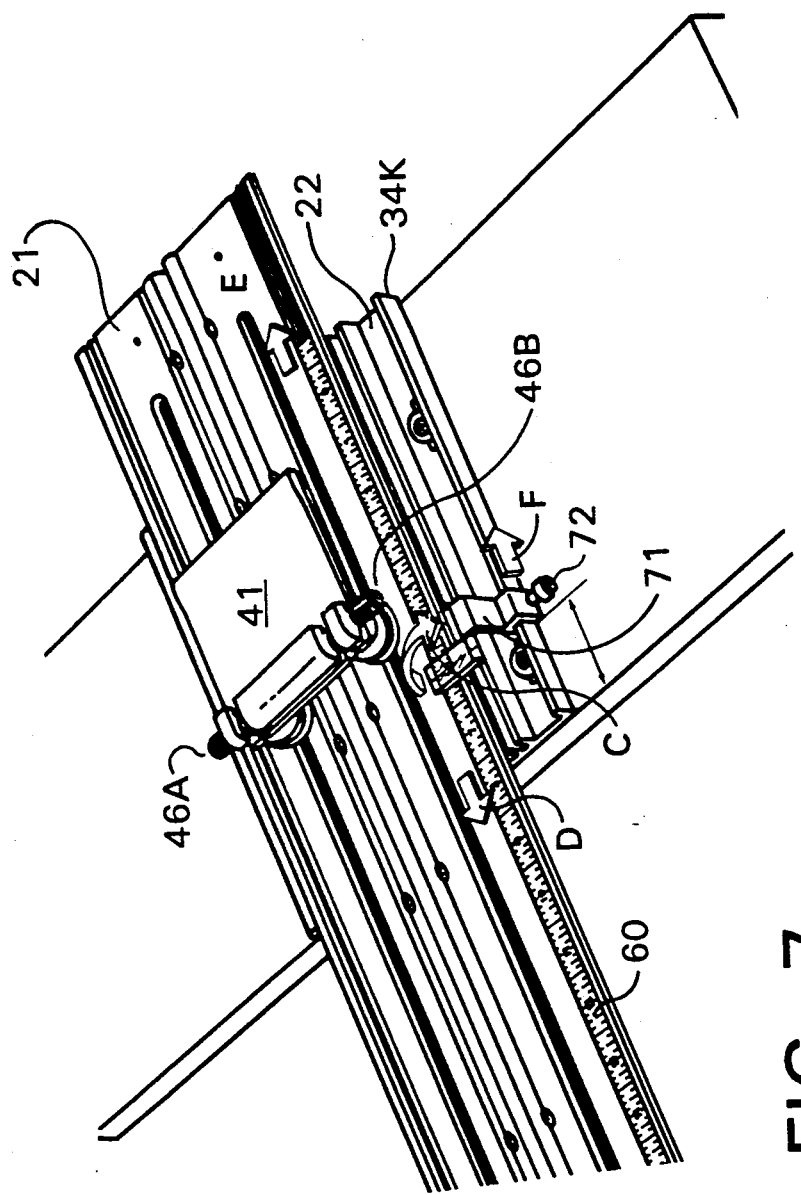
FIG. 7 is a perspective view illustrating operation of the hairline cursor and cooperative scale.

Now referring to FIG. 7 and the left hand side of FIG. 8, it will be observed that they show the aforementioned hairline cursor assembly 70 which includes cursor mounting bracket 71 shown mounted on longitudinally extending ridge 34k by tightening knurled knob screw 72. At the upper end of mounting bracket 71 there is positioned a threaded pivot 73, the parts for which are shown in FIG. 3. There, it will be seen are acrylic hairline cursor 74 and a mounting screw 75. As will be evident to those skilled in the art, the internal diameter of threaded pivot recess 73 (FIG. 8) is greater than the outside diameter of mounting screw 75, thus resulting in a fit with sufficient clearance to permit cursor 74 to be flipped upwardly in rotation about the axis of mounting screw 75 if the operator so desires (depicted by arrow C in FIG. 7) and also so as to permit its lower surface to retain engagement with the upper surfaces of jig top portion block 29 so as to follow the movement thereof between the engaged and disengaged (locked and unlocked) positions as described above. The threads on the exterior surface of mounting screw 75 not only provide a useful way of mounting hairline cursor 74 and retaining it in the desired position but additionally prevent undesired lateral movement of the hairline.

While examining FIG. 7, it should be noted that three additional arrows are depicted. These arrows which are identified with the letters D, E, and F are included to illustrate relative movement of the respective parts. Thus, arrows D and E are included so as to represent forward and rearward movement of jig top portion 21 with respect to jig base portion 22, and also to represent the motion of the scale 60 in the scale slot 61. Arrow F is included to represent the lateral movability of hairline cursor assembly 70 along its supporting ridge 34k.

As previously mentioned in connection with the description of FIG. 4, spring members 32a and 32b normally urge jig base block 26 and jig top block 29 apart so as to disengage the aforementioned teeth of toothed rack members 27a/27b and 28a/28b. However, when cam clamp assembly operating handle is swiveled into its horizontal or locking position as shown in FIG. 2, the above-described camming action overcomes the spring-imparted force normally urging such members apart and presses downwardly so that spring members 32a and 32b move from the positions shown in solid lines to the positions shown in dotted lines in FIG. 8. At the same time, the under surface of jig top portion block 29 moves from the position shown in solid lines downwardly to the corresponding position shown in dotted lines. When this occurs, acrylic hairline cursor 74 swivels about pivot 73 so as to move from the position shown in solid lines to the corresponding position shown in dotted form.

Figure 9:
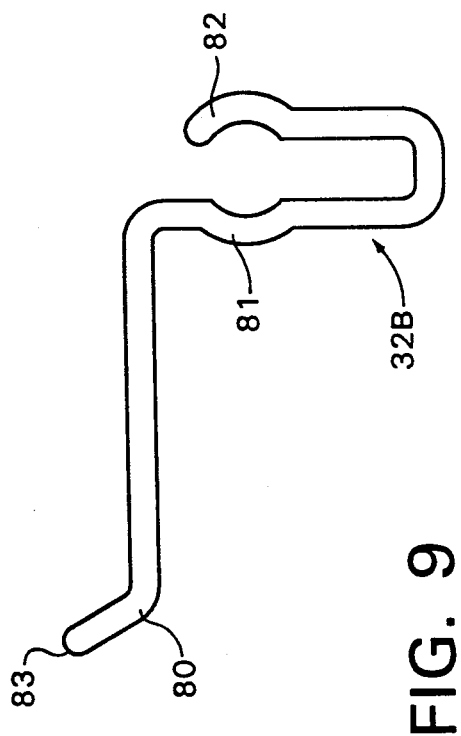
FIG. 9 is a section taken through the elongated resilient spring members of FIG. 3.

As mentioned above, FIG. 9 depicts in enlarged cross-section elongated resilient spring member 32b. Since spring member 32a is similar to member 32b, it will be evident to one skilled in the art that FIG. 9 is illustrative of both members 32a and 32b. Although not critical to implementation of the inventive concepts hereof, in accordance with the preferred embodiment, the elongated resilient spring members in a cross-section are characterized by having an extending arm 80 terminating in a low-friction engaging surface 83, an irregularly protruding portion 81 and a laterally disposed upper right side portion 82. As will be evident from inspection of FIG. 8, protrusion 81 and irregular configuration 82 cooperate with the adjacent ridges to provide lateral frictional engagement with the corresponding sidewalls of ridges 34i and 34j, thereby retaining elongated resilient spring member 32b in its desired position. The resiliency of member 82a provides extra friction and also allows spring member 32b to be snapped or slid into the corresponding sidewalls of ridges 34i and 34j. Of course, as will be evident to one skilled in the art, spring member 32a is similar to member 32b only having been turned through 180 degrees so that it becomes a mirror thereof. Accordingly, similar considerations are applicable also to resilient spring member 32a.

It will now be evident to those skilled in the art that there has been described herein an improved positioning jig assembly which provides enhanced ease and rapidity of operation and adjustment and which provides for ready and rapid identification of scaler quantities relating to dimensioning and tolerances.

Although the invention hereof has been described by way of example of a preferred embodiment, it will be evident that other adaptations and modifications can be employed without departing from the spirit and scope thereof. For example, alternatives may be employed for providing the thrust necessary to disengage the upper and lower principal assemblies when the cam clamp is in its disengaged position.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A positioning jig comprising:
   (a) a first elongated substantially flat member having a principal longitudinal axis, an upper surface and a lower surface;
   (b) a second elongated substantially flat member having a principal longitudinal axis, an upper surface and a lower surface; said lower surface of said first member being adapted for controllably moveable engagement with said upper surface of said second member when said lower surface of said first member and said upper surface of said second member are separated by greater than a predetermined distance and being locked together when said lower surface of said first member and said upper surface of said second member are closer than said predetermined distance; and
   (c) a multi-position cam clamp mounted on one of said substantially flat members effective when in a first position to position said lower surface of said first member and said upper surface of said second member closer than said predetermined distance, and when in a second position to separate said lower surface of said first member and said upper surface of said second member by said greater than said predetermined distance.

2. A positioning jig according to claim 1 in which said cam clamp is mounted over said first elongated substantially flat member.

3. A positioning jig according to claim 1 in which said upper and said lower surfaces of said first flat member are essentially planar and parallel.

4. A positioning jig according to claim 1 in which said upper and said lower surfaces of said second flat member are essentially planar and parallel.

5. A positioning jig according to claim 2 in which said upper and said lower surfaces of said first flat member are essentially planar and parallel.

6. A positioning jig according to claim 2 in which said upper and said lower surfaces of said second flat member are essentially planar and parallel.

7. A positioning jig according to claim 2 in which said upper and said lower surfaces of said first flat member are essentially planar and parallel and in which said upper and said lower surfaces of said second flat member are essentially planar and parallel.

8. A positioning jig according to claim 1 further including, in combination, (a) an elongated slotted recess in said upper surface of one of said first elongated member and said second elongated member, said slotted recess extending longitudinally substantially parallel to said principal longitudinal axis; and (b) an elongated scale inserted within said elongated slotted recess and movably positionable therewithin.

9. A positioning jig according to claim 8 wherein said elongated scale has a predetermined width and wherein said elongated slotted recess has a width a predetermined amount less than the width of said elongated scale whereby said elongated scale is slideably retained in position within said elongated slotted recess by frictional engagement.

10. A positioning jig according to claim 8 wherein said elongated scale has a predetermined width and wherein said elongated slotted recess includes at least one central projection projecting upwardly within said slotted recess for a predetermined distance thereby to bow upwardly the central axial portion of said elongated scale thereby to impart friction between a portion of said elongated scale and a portion of said slotted recess.

11. A positioning jig according to claim 8 further including, in combination,
(a) a hairline cursor; and
(b) adjustable means adjustably interconnecting said hairline cursor and one of said first elongated member and said second elongated member thereby to adjustably affix said hairline cursor thereto.

12. A positioning jig according to claim 11 wherein said adjustable means includes a threaded screw for adjustably affixing said hairline cursor.

13. A positioning jig according to claim 1 wherein said first elongated substantially flat member includes a pair of elongated parallel slotted openings from said upper surface to said lower surface, said parallel slotted openings being essentially parallel to and on either side of said principal longitudinal axis; and wherein said multi-position cam clamp includes:
(a) a pair of posts extending from said upper surface of said second elongated substantially flat member upwardly through said elongated parallel slotted openings;
(b) a pivot pin extending between and joining upper ends of said posts;
(c) a cam clamp arm pivotally mounted on said pivot pin and adapted for semi-rotational movement thereupon;
(d) a camming surface mounted adjacent one of said posts and interconnected with said second elongated member;
(e) cam means attached to said cam clamp arm for engaging said camming surface and for imparting cam actuated movement between said first elongated substantially flat member and said second elongated substantially flat member thereby to provide greater than said predetermined distance therebetween when said cam clamp arm is in one predetermined position and to provide less than said predetermined distance therebetween when said cam clamp arm is rotationally moved to another predetermined position.

14. A positioning jig according to claim 13 wherein said one predetermined position is with said cam clamp being disposed in a plane essentially perpendicular to said upper surface of said first elongated substantially flat member.

15. A positioning jig according to claim 13 wherein said another predetermined position is with said cam clamp being disposed in a plane essentially parallel to said upper surface of said first elongated substantially flat member.

16. A positioning jig according to claim 13 wherein said cam clamp further includes a pair of elongated resilient members mounted on said second elongated substantially flat member and having spring-thrust imparting surfaces engaging said lower surface of said first elongated substantially flat member thereby to impart thrust between said first elongated substantially flat member and said second elongated substantially flat member thereby to urge said flat members apart.

17. A positioning jig according to claim 16 in which said spring-thrust imparting surfaces are low friction.

18. A positioning jig according to claim 1 in which said cam clamp includes resilient means responsive to compressive force for compensating for tolerance variations within said cam clamp.

19. A positioning jig according to claim 18 in which said resilient means includes a pair of rubber washers.

20. A positioning jig according to claim 13 wherein said multi-position cam clamp further includes resilient members mounted on said posts for compensating for tolerance variations within said cam clamp.

* * * * *